United States Patent [19]

Brück et al.

[11] Patent Number: 5,225,243
[45] Date of Patent: Jul. 6, 1993

[54] FIBER-REINFORCED COMPOSITE MATERIALS AND PROCESS FOR THEIR PREPARATION

[75] Inventors: Martin Brück, Hofheim am Taunus; Tilo Vaahs, Kelkheim/Taunus; Hans-Jerg Kleiner, Kronberg; Marcellus Peuckert, Hofheim am Taunus, all of Fed. Rep. of Germany

[73] Assignee: Hoechst Aktiengesellschaft, Frankfurt am Main, Fed. Rep. of Germany

[21] Appl. No.: 661,885

[22] Filed: Feb. 27, 1991

[30] Foreign Application Priority Data

Mar. 1, 1990 [DE] Fed. Rep. of Germany ....... 4006371

[51] Int. Cl.$^5$ .......................... B05D 3/02; B05D 3/10
[52] U.S. Cl. .................................. 427/226; 427/340; 427/387
[58] Field of Search .......................................... 427/226

[56] References Cited

U.S. PATENT DOCUMENTS

| | | | |
|---|---|---|---|
| 5,032,663 | 7/1991 | Vaahs et al. | 525/477 |
| 5,100,975 | 3/1992 | Vaahs et al. | 528/37 |
| 5,114,749 | 5/1992 | Nishio et al. | 427/226 |
| 5,133,993 | 7/1992 | Streckert et al. | 427/226 |

FOREIGN PATENT DOCUMENTS

0125772  11/1984  European Pat. Off.

*Primary Examiner*—Shrive Beck
*Assistant Examiner*—Erma Cameron
*Attorney, Agent, or Firm*—Connolly and Hutz

[57] ABSTRACT

The invention relates to fiber composite materials and a process for their preparation.

The process comprises impregnating fibers with a molten polysilazane in a first step, converting the polysilazane in the fibers into the non-fusible state in a second step, and heating the impregnated fibers to 800° to 2000° C. in a nitrogen, noble gas or ammonia atmosphere in a third step.

9 Claims, No Drawings

FIBER-REINFORCED COMPOSITE MATERIALS AND PROCESS FOR THEIR PREPARATION

The present invention relates to fiber-reinforced composite materials and a process for their preparation.

Fiber-reinforced composite materials are gaining a continuously increasing importance because of their high breaking strength, dimensional stability and resistance to heat and corrosion. The good properties of the fiber-reinforced composite materials are based on the combination of a matrix with incorporated threads.

European Patent A-0,125,772 describes a fiber composite ceramic in which fibers are first impregnated with polysilazane and the polysilazane is then decomposed by heat to give silicon nitride. The disadvantage of this process is that the polysilazane has to be dissolved in a solvent during impregnation of the fibers. After the impregnation, the solvent has to be removed. Hollow spaces form as a result of the removal of the solvent from the fiber composite, which means that a fiber composite ceramic which is not always satisfactory in its properties results. It has been found that fiber composite ceramics have an increasing breaking strength and dimensional stability if only a few hollow spaces are present in the fiber composite ceramic.

There was therefore the object of providing a process for the preparation of fiber-reinforced composite materials with which a fiber composite ceramic which has an increased breaking strength and dimensional stability, is dimensionally stable and can easily be processed in the crude state and remains dimensionally stable during heating is obtained.

The present invention relates to a process for the preparation of fiber-reinforced composite materials, which comprises impregnating fibers with a molten polysilazane in a first step, converting the polysilazane in the fibers into the non-fusible state by means of $NH_3$, urotropine or an amine in a second step, and heating the impregnated fibers to 800° to 2000° C. in a nitrogen, noble gas or ammonia atmosphere in a third step, the polysilazanes being obtainable by reacting oligosilazanes of the formula (I)

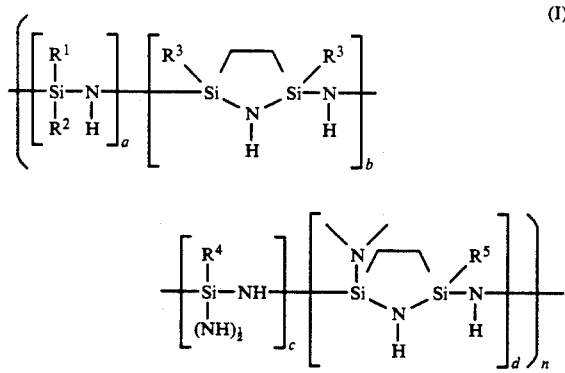

(I)

in which $0 \leq a$, $b \leq 1$, $a+b \geq 0.3$, $0 \leq c$, $d < 0.7$ and n is about 2 to about 12, with at least one of the chlorosilanes $Cl_2R^6Si—CH_2CH_2—SiR^6Cl_2$, $Cl_3Si—CH_2CH_2—SiR^7Cl_2$, $R^8SiCl_3$ or $R^9SiHCl_2$ in which, independently of one another, $R^1$, $R^2$ and $R^4$ are H, $C_1$-$C_6$-alkyl or $C_2$-$C_6$-alkenyl and $R^3$, $R^5$, $R^6$, $R^7$, $R^8$ and $R^9$ are $C_1$-$C_6$-alkyl or $C_2$-$C_6$-alkenyl, at 30° C. to 300° C. and wherein the reaction of oligosilazanes of the formula $(R^1SiHNH)_n$, i.e. formula (I) where $a=1$, $b=c=d=0$ and $R^2=H$, with $R^9SiHCl_2$ is to be excluded.

"Fibers" here should be understood as meaning all types of one-dimensional structures as well as two-dimensional and three-dimensional structures composed of these. The fibers which are useful in the present invention are those fibers which are resistant to pyrolysis temperatures (e.g., fibers which can withstand temperatures of about 800° to 2000° C.).

Preferably, independently of one another, $R^1$, $R^2$ and $R^4$ are H, $C_1$-$C_3$-alkyl or $C_2$-$C_3$-alkenyl and $R^3$, $R^5$, $R^6$, $R^7$, $R^8$ and $R^9$ are $C_1$-$C_3$-alkyl or $C_2$-$C_3$-alkenyl. The case where $R^1=H$, $R^2=R^3=R^5=R^6=R^7=R^9=CH_3$ and, independently of one another, $R^4$ and $R^8$ are $CH_3$ or vinyl, is particularly preferred. a, b, c and d are the molar fractions of the particular structural units, wherein $a=b=c=d=1$. $0 \leq a \leq 1$ and $0 \leq b \leq 1$ here, but with the additional condition that the sum of $a+b \geq 0.3$, from which it follows that at least one of the indices a and b must be other than zero. Furthermore, $0 \leq c < 0.7$ and $0 \leq d < 0.7$; these two indices can simultaneously be zero. The reaction of $(R^1SiHNH)_n$, i.e. formula (I) where $a=1$, $b=c=d=0$ and $R^2=H$, with $R^9SiHCl_2$, and the use of the polysilazane formed in this reaction for the preparation of fiber-reinforced composite materials is already described in German Patent Application P 38 40 781.7. The present invention therefore does not relate to the use mentioned.

The preparation of the polysilazanes employed in the process according to the invention has essentially already been described in German Patent Application P 38 40 779.5; they are called "polysubstituted chlorine-containing silazane polymers" in that application. This preparation proceeds as follows:

The oligosilazanes employed as starting substances for the polysilazanes must first be prepared. These can be obtained by reacting excess ammonia at $-70°$ C. to $+100°$ C. with a starting material which contains at least one of the two components (II) $R^1R^2SiCl_2$ and (III) $Cl_2R^3Si—CH_2CH_2—SiR^3Cl_2$ and can additionally contain one or both components (IV) $R^4SiCl_3$ and (V) $Cl_3Si—CH_2CH_2—SiR^5Cl_2$ (depending on whether $c>0$ and/or $d>0$). In this reaction, independently of one another, $R^1$, $R^2$ and $R^4$ are H, $C_1$-$C_6$-alkyl or $C_2$-$C_6$-alkenyl and $R^3$ and $R^5$ are $C_1$-$C_6$-alkyl or $C_2$-$C_6$-alkenyl, and the molar percentage content of (II) or (III) or the mixture thereof in the starting material is 30% ($c>0$ or $d>0$ or both $>0$) to 100% ($c=d=0$).

The chlorosilanes (II) $R^1R^2SiCl_2$ and (IV) $R^4SiCl_3$ employed as starting materials for the oligosilazanes are commercially available, and the ethylene-bridged species (III) and (V) are accessible by hydrosilylation of commercially available $R^3HSiCl_2$ and ethyne, or by hydrosilylation of vinyltrichlorosilane and $R^5HSiCl_2$.

To prepare the oligosilazanes, the chlorosilanes are preferably initially introduced into a solvent which is inert towards the reactants—chlorosilanes and $NH_3$—and are mixed with ammonia until saturated, which occurs when all the SiCl functions are substituted by NH groups.

Suitable solvents for this reaction are, for example, saturated aliphatic or aromatic hydrocarbons, such as n-pentane, cyclohexane and toluene, chlorinated hydrocarbons, such as chloroform or chlorobenzene, or ethers, such as diethyl ether or tetrahydrofuran.

If appropriate, the preparation of the oligosilazanes can also be carried out under reduced pressure, or under pressures of 1 to 100 bar. Ammonia can be metered in as a gas or as a liquid. The process can also be designed as a continuous process.

The polysilazanes can now be obtained from the resulting oligosilazanes of the formula (I) by reaction with the chlorosilanes $Cl_2R^6Si-CH_2CH_2-SiR^6Cl_2$, $Cl_3Si-CH_2CH_2-SiR^7Cl_2$, $R^8SiCl_3$ or $R^9SiHCl_2$, and are then finally employed for the preparation according to the invention of fiber-reinforced composite materials.

The molar ratio of the reactants of chlorosilane:monomer unit of the oligosilazane (n=1) in this reaction to give the polysilazane is preferably about 0.1:1 to about 1.5:1, in particular about 0.1:1 to about 0.7:1.

For the reaction of these reactants with one another, the oligosilazanes are preferably initially introduced into the reaction vessel and at least one of the chlorosilanes mentioned is added. Since the reaction is exothermic, the temperature is preferably first kept at 30° to 50° C. when the reactants are brought together. The mixture is then heated to temperatures of 100° to 300° C., preferably to 120° to 250° C.

When the reaction has ended, the more readily volatile compounds are in general removed from the reaction vessel by applying a vacuum.

Most of the $NH_4Cl$ also formed during the reaction sublimes out of the reaction mixture in the course of the reaction. Any $NH_4Cl$ which still remains can be separated off by extraction with an inert organic solvent, such as n-hexane, toluene or ether, from the polymeric chlorosilazane prepared according to the invention.

The reaction time depends on the rate of heating up and the reaction temperature. A reaction time of 3 to 7 hours is generally sufficient.

It is also possible for the reaction to be carried out in an organic solvent. Suitable solvents are those which are inert towards the reactants and have a sufficiently high boiling point, that is to say, for example, saturated aliphatic or aromatic hydrocarbons, such as n-decane, decalin, xylene and toluene, chlorinated hydrocarbons, such as chlorobenzene, or ethers, such as dibenzyl ether and diethylene glycol diethyl ether. If a solvent in which the $NH_4Cl$ formed is insoluble is used, the latter can be separated off by filtration. The polymeric chlorosilazanes according to the invention are then obtained by distilling off the solvent under reduced pressure.

If appropriate, the process can also be carried out under reduced pressure. It can also be carried out under pressures in the range from 1 to 10 atmospheres.

The process can also be designed as a continuous process.

The fibers employed together with the polysilazanes in the process according to the invention can consist of, for example, C, SiC, $Si_3N_4$, $Al_2O_3$ or carbon fiber-reinforced carbon. It is possible, for example, first to spin molten polysilazane to fibers, to convert these into $Si_3N_4$ fibers by means of heat at 800° to 1600° C., to prepare a two-dimensional structure from these, subsequently to impregnate this according to the invention with the same or another molten polysilazane, to convert the polysilazane into the non-fusible state and to heat the structure to 800° to 2000° C.

If the polysilazane is rendered non-fusible by means of an amine, methylamine or ethylamine is in general used. However, the preferred agent for rendering the polysilazane non-fusible is $NH_3$.

The combination of steps according to the invention can also be applied several times in succession to the same fibers.

It is furthermore possible to dissolve compounds of magnesium, aluminum, yttrium or a rare earth metal, individually or as a mixture, in the molten polysilazane as a filler for the fibers and to impregnate the fibers with this solution instead of with pure polysilazane; particularly suitable compounds are the nitrates, alcoholates, acetates or acetylacetonates, individually or as a mixture.

The impregnated fibers can of course also be shaped into a shaped article before heating.

The invention furthermore relates to a fiber-reinforced composite material which is obtainable by the process just described.

The present invention furthermore relates to a fiber-reinforced composite material consisting of fibers and a ceramic, amorphous or partly crystalline matrix, the matrix containing 35-60% by weight of Si, 20-40% by weight of N, 0-30% by weight of C, 0-25% by weight of Cl and 0-20% by weight of O, which is obtainable by the process mentioned; above all in its preferred embodiments.

To increase the corrosion resistance, it may be advantageous to subject the finished and already mechanically worked fiber-reinforced composite material to further treatment with molten polysilazane, in particular to coat it with this, to render the coating non-fusible and then to heat the material to 800° to 2000° C. in a nitrogen, noble gas or ammonia atmosphere.

Surprisingly, it has been found that in the preparation according to the invention of the fiber-reinforced composite material a single impregnation with molten polysilazane, followed by rendering the polysilazane non-fusible and heating the material (three-step sequence), often already results in a completely adequate breaking strength of the fiber composite material. However, a further increase in the breaking strength and corrosion resistance of the fiber-reinforced composite material can sometimes be achieved by several three-step sequences carried out in succession.

The process according to the invention can be applied similarly to one-dimensional structures and two-dimensional and three-dimensional structures built up from these, that is to say materials such as fabric, woven articles, non-wovens, filaments, threads, fibers, strands or networks. As stated, the term "fibers" is to be used representatively for all these structures. The fibers can be immersed in molten polysilazane, or the molten polysilazane is dripped or poured onto the fibers. It may be advantageous to form thicker shaped articles from relatively thin individual impregnated areas of material by layering these on top of one another and to process these shaped articles further after conversion of the polysilazane into the non-fusible state; in other cases, it may be better to layer the initially non-impregnated layers of material on top of one another and to impregnate this heap in total with polysilazane.

If the heating of the impregnated fibers (following rendering of the polysilazane non-fusible) is carried out in a nitrogen or noble gas atmosphere at 800° to 1200° C., an amorphous matrix which consists of about 35 to 60% by eight of Si, 20 to 35% by weight of N, 15 to 30% by weight of C and O and Cl as the remainder is obtained.

On the other hand, if the heating of the impregnated fibers is carried out in an ammonia atmosphere or an ammonia-containing inert gas atmosphere at 800° to 1200° C., an amorphous matrix which consists of about 50 to 60% by weight of Si, 30 to 40% by weight of N, less than 5% by weight of O, less than 1% by weight of C and less than 1% by weight of Cl is obtained.

Heating in $N_2$, a noble gas or $NH_3$ to temperatures of 1200° C. to about 1600° C., in particular 1400° C. to about 1600° C., gives a matrix which is partly crystalline and consists predominantly of $\alpha$-$Si_3N_4$.

Heating to temperatures of about 1600° to 2000° C. gives a matrix which largely consists of $\beta$-$Si_3N_4$. Above about 1800° C., heating must be carried out under an increased nitrogen pressure of about 10 to 50 bar in order to prevent decomposition of the $Si_3N_4$.

The present invention furthermore relates to a process for coating mechanically worked fiber-reinforced composite materials (e.g., fiber-reinforced composite materials that have been exposed to conventional processes such as cutting, milling, polishing, drilling or other similar mechanical working processes); which comprises covering the mechanically worked fiber-reinforced composite material with molten polysilazane in a first step, converting the polysilazane into the non-fusible state by means of $NH_3$, urotropine or an amine in a second step, and heating the covered fiber-reinforced composite material to 800° to 2000° C. in an $N_2$ noble gas or $NH_3$ atmosphere in a third step, the polysilazanes being obtainable by reacting oligosilazanes of the formula (I)

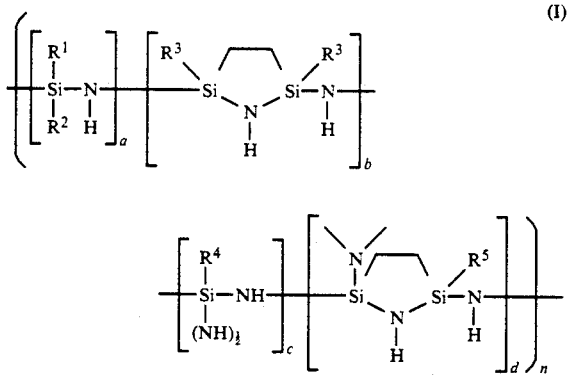

in which $0 \leq a$, $b \leq 1$, $a+b \geq 0.3$, $0 \leq c,d < 0.7$ and n is about 2 to about 12, with at least one of the chlorosilanes $Cl_2R^6Si$—$CH_2CH_2$—$SiR^6Cl_2$, $Cl_3Si$—$CH_2CH_2$—$SiR^7Cl_2$, $R^6SiCl_3$ or $R^9SiHCl_2$ in which, independently of one another, $R^1$, $R^2$ and $R^4$ are H, $C_1$-$C_6$-alkyl or $C_2$-$C_6$-alkenyl and $R^3$, $R^5$, $R^6$, $R^7$, $R^8$ and $R^9$ are $C_1$-$C_6$-alkyl or $C_2$-$C_6$-alkenyl, at 30° C. to 300° C., and wherein the reaction of $(R^1SiHNH)_n$, i.e. formula (I) where $a=1$, $b=c=d=0$ and $R^2=H$, with $R^9SiHCl_2$ is to be excluded.

By this process it is possible to cover materials which are unstable to oxidation, such as, for example, carbon fibers, with a layer containing silicon nitride and in this way to protect them from oxidation at a high temperature or corrosion.

$NH_3$ is preferably used to render the polysilazane non-fusible in the processes described above.

In the following examples, the flexural strength of the fiber-reinforced composite materials was measured on an Instron 1326 universal testing machine as the 4-point flexural breaking strength in accordance with the USA Standard Mil.-STD 1942:

4-point support with 40 mm/20 mm support separation and a constant increase in the force of 500 N/s on test specimens having the dimensions 3.5 mm × 4.5 mm × 45 mm.

The examples which follow the experimental report illustrate the invention. The percentage figures are percentages by weight, unless noted otherwise.

Experimental report

A general description of the process, according to which first oligosilazanes of the formula (I) and from them polysilazanes can be prepared, is initially given below. More precise information on the actual reactants employed are to be found in the sections "Polysilazane 1" to "Polysilazane 6" of the experimental report. The examples which illustrate the preparation according to the invention of fiber-reinforced composite materials are described after the experimental report.

a) Preparation of the oligosilazanes

The chlorosilane chosen was dissolved in 1.5 l of absolute tetrahydrofuran in a 2 l four-necked flask with a stirring device, cooling and gas inlet possibility. Ammonia was then passed in at temperatures between 0° C. and 10° C. until saturation was achieved. When the reaction had ended, the mixture was allowed to thaw and the ammonium chloride formed was separated off.

The filtrate was freed from tetrahydrofuran and the other volatile constituents under a reduced pressure of up to about 10 mbar and at about 40° C. The solvent-free oligosilazane remained as a clear, readily mobile oil.

b) Preparation of the polysilazane

The resulting oligosilazane was dissolved in 150 ml of toluene, and the chosen chlorosilane or chlorosilanes were carefully added. During this addition, the internal temperature rose to 50° C. The mixture was then heated under reflux for 2 hours, during which a colorless precipitate formed. Thereafter, the solvent was distilled into a cold trap at $-78°$ C. under reduced pressure, the temperature of the oil bath being increased by 10° C. every 15 minutes and the pressure inside the flask being reduced somewhat, so that finally 0.1 mbar was reached at 220° C.

During this procedure, some of the reaction mixture sublimed onto the colder parts of the vessel, and a clear melt remained. On cooling, this became more viscous, and finally solid; at 20° C. the resulting substance was vitreous and brittle, and clearly transluscent.

Polysilazane 1

An oligosilazane of the formula (I) where $a=0.82$, $c=0.18$ and $b=d=0$

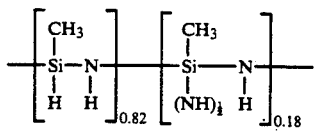

was prepared from ammonia and
200 ml (223.0 g; 1.94 mol) of $CH_3SiHCl_2$ and
50 ml (63.6 g; 0.43 mol) of $CH_3SiCl_3$.

To form the polysilazane, the oligosilazane was reacted with 200 ml (223 g; 1.94 mol) of $CH_3SiHCl_2$.

Polysilazane 2

An oligosilazane of the formula (I) where a=0.5, b=0.4, d=0.1 and c=0

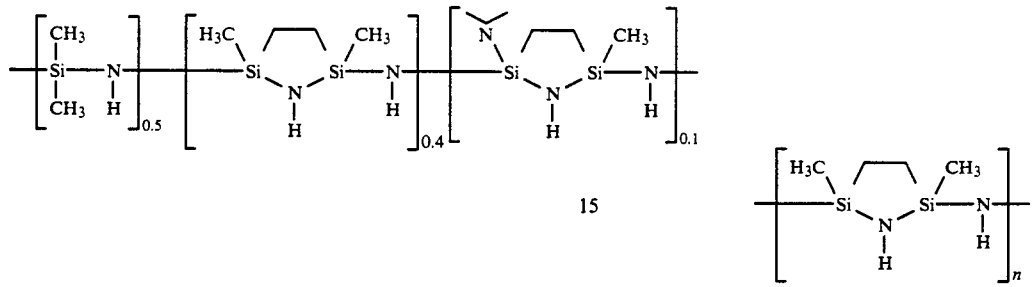

was prepared from ammonia and
150 ml (159.6 g; 1.24 mol) of $(CH_3)_2SiCl_2$,
200 ml (245.4 g; 0.96 mol) of $Cl_2CH_3Si-CH_2-CH_2-SiCH_3Cl_2$ and
50 ml (67.3 g; 0.24 mol) $Cl_3Si-CH_2CH_2-SiCH_3Cl_2$.

To form the polysilazane, the oligosilazane was reacted with 250 ml 63.6 g; 0.43 mol) of $CH_3SiCl_3$.

Polysilazane 3

An oligosilazane of the formula (I) where b=0.79, c=0.21 and a=d=0

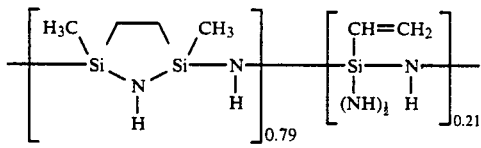

was prepared from ammonia and
300 ml (368.1 g; 1.44 mol) of $Cl_2CH_3Si-CH_2CH_2-SiCH_3Cl_2$
50 ml (63.5 g; 0.39 mol) of $H_2C=CH-SiCl_3$.

To form the polysilazane, the oligosilazane was reacted with 250 ml (63.3 g; 0.4 mol) of $CH_3SiCl_3$.

Polysilazane 4

An oligosilazane of the formula (I) where a=0.73, b=0.27 and c=d=0

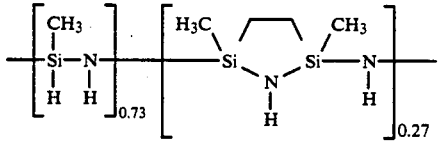

was prepared from ammonia and
200 ml (223 g; 1.94 mol) of $CH_3SiHCl_2$ and
150 ml (184 g; 0.72 mol) of $Cl_2CH_3Si-CH_2CH_2-SiCH_3Cl_2$.

To form the polysilazane, the oligosilazane was reacted with 300 ml (334.5 g; 2.9 mol) of $CH_3SiHCl_2$.

Polysilazane 5

An oligosilazane of the formula (I) where b=1 and a=c=d=0

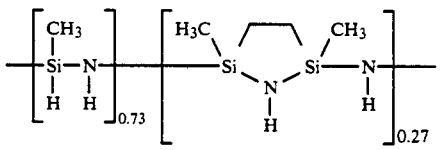

was prepared from ammonia and
200 ml (254 g; 0.96 mol) of $Cl_2CH_3Si-CH_2CH_2-SiCH_3Cl_2$ To form the polysilazane, the oligosilazane was reacted with 21.1 ml (26.9 g; 0.18 mol) of $CH_3SiCl_3$.

Polysilazane 6

An oligosilazane of the formula (I) where a=0.73, b=0.27 and c=d=0

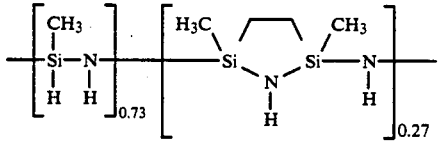

was prepared from ammonia and
200 ml (223 g; 1.94 mol) of $CH_3SiHCl_2$ and
150 ml 184 g; 0.72 mol) of $Cl_2CH_3Si-CH_2CH_2-SiCH_3Cl_2$.

To form the polysilazane, the oligosilazane was reacted with a mixture of 100 ml (111.5 g; 0.97 mol) of $CH_3SiHCl_2$ and 50 ml (63.5 g; 0.39 mol) $CH_2=CH-SiCl_3$.

EXAMPLE 1

Polysilazane 1 and carbon fibers (®Sigrafil C from Sigri GmbH, Meitingen, FRG; with 40000 individual threads of 7 μm diameter each) were introduced into a vessel. The vessel was placed under a nitrogen atmosphere and heated to 150° C. The carbon fibers had been freed from their size beforehand in an acetone bath.

The impregnated carbon fibers were removed from the polysilazane melt and cooled to 25° C. 20 carbon fibers impregnated in this manner were piled up in a layer at right-angles to one another to form a block and the block was pressed in a press at a temperature of 120° C. under a pressure of 50 bar. The shaped article thus obtained was heated from room temperature to 250° C. in an $NH_3$ atmosphere over a period of 10 hours and kept at this temperature for 5 hours in order to render the polysilazane non-fusible. The shaped article was then heated to a temperature of 1000° C. in a nitrogen atmosphere over a heating-up time of 20 hours, kept at this temperature for 1 hour and then cooled. The breaking strength measured on the resulting fiber-reinforced composite material is recorded in the table which follows the examples.

EXAMPLE 2

A fiber-reinforced composite material was prepared as in Example 1. This was then subjected to two further three-step sequences (impregnation, rendering non-fusible, heating) with the same polysilazane as in Example 1. The flexural breaking strength measured on the resulting fiber-reinforced composite material is again recorded in the table.

EXAMPLE 3

Polysilazane 2 and $Al_2O_3$—$SiO_2$ fibers (85% $Al_2O_3$, 15% $SiO_2$) with 1000 individual threads of 0.017 mm diameter each were heated to 180° C. in a vessel under a nitrogen atmosphere and the fibers were then removed from the melt and cooled to 25° C. The impregnated fibers were formed into a layer in a cross-wise manner and pressed in a press at 110° C. under a pressure of 40 bar to give a shaped article. The impregnated material was kept at room temperature under an ammonia atmosphere in a pressure vessel for 2 hours and then heated to a temperature of 1400° C. under an ammonia pressure of 10 bar in the course of 15 hours, kept at this temperature for 10 hours and subsequently cooled. The matrix consisted of $\alpha$-$Si_3N_4$ to the extent of 44% by weight. The flexural breaking strength measured on the resulting fiber-reinforced composite material is again recorded in the table.

EXAMPLE 4

SiC fibers with 500 individual threads of 0.015 mm diameter each were drawn, under nitrogen as the inert gas, through a bath of molten polysilazane 3 with an addition of 5% by weight of yttrium acetate. The SiC fibers impregnated in this way were piled on top of one another in a cross-wise manner, pressed at a temperature of 100° C. in a press under a pressure of 40 bar and kept in an ammonia atmosphere at 150° C. for 10 hours. The molding was heated to 1700° C. under a nitrogen pressure of 5 bar in the course of 15 hours, left at this temperature for 10 hours and then cooled.

The matrix consisted of $\beta$-$Si_3N_4$ to the extent of 68% by weight. The flexural breaking strength measured on the resulting fiber-reinforced composite material is again recorded in the table.

EXAMPLE 5

Polysilazane 4 was introduced, under $N_2$ as the inert gas, into a melt spinning apparatus and heated to 160° C. and the melt was forced by means of a piston through a spinneret of 0.1 mm diameter. The spun fiber was stretched to a fiber thickness of 20 $\mu$m by a high take-off speed and a fiber falling zone of 1.50 m. The resulting fibers were rendered non-fusible in an $NH_3$ atmosphere and then pyrolyzed in an oven under an $NH_2$ atmosphere. For this, the temperature was increased from 25° C. to 1200° C. in the course of 10 hours, kept at 1200° C. for 1 hour and then dropped again to room temperature in the course of 4 hours. The resulting fiber was amorphous under X-rays and also contained, in addition to Si and N as the main constituents, 0.1% by weight of C, 0.6% by weight of Cl and 2.0% by weight of O. The ceramic yield of the pyrolysis was 67% by weight. The tensile strength of the fiber was 2 GPa.

The fibers thus prepared were drawn in strands of in each case 500 individual threads through a bath of molten polysilazane 5 under nitrogen as the inert gas. The fibers impregnated in this way were piled on top of one another in a cross-wise manner and pressed at 100° C. under a pressure of 40 bar to give a shaped article. The shaped article was heated from room temperature to 150° C. in an $NH_3$ atmosphere in the course of 5 hours. Under a nitrogen pressure of 1 bar, the molding was heated to 1200° C. in the course of 20 hours, left at this temperature for 10 hours and then cooled. The flexural breaking strength measured is recorded in the table.

EXAMPLE 6

A) Polysilazane 4 was spun to fiber in the same way as described in Example 5. The polysilazane fiber thus prepared was then heated from room temperature up to 500° C. at a heating-up rate of 0.5K/minute in a pure ammonia atmosphere and subsequently pyrolyzed by heating from 500° C. to 1300° C. in a nitrogen atmosphere in the course of 6 hours. The temperature of 1300° C. was maintained for 1 hour and the fiber was then cooled to room temperature at a rate of 4K/minute. The elemental composition of the resulting fiber was 54.1% by weight of Si, 35.3% by weight of N, 5.8% by weight of C, 1.5% by weight of Cl, 2.9% by weight of O and 0.4% by weight of H.

The tensile strength of the fibers, which were amorphous under X-rays, was on average 2.4 GPa.

B) The fibers thus obtained were combined to multifilaments of 500 individual fibers each and drawn through a melt of polysilazane 6 under nitrogen.

The impregnated fiber bundles were piled up at an angle of 90° C. to one another. The resulting article was pressed under a pressure of 45 bar in an $N_2$ atmosphere. After the temperature had been kept at 100° C. for 2 hours, the article was slowly cooled to room temperature and the pressure released.

Subsequent pyrolysis was carried out in an $NH_3$-containing atmosphere, and in particular at a heating-up rate of 0.5K/minute. The final temperature was 1350° C., which was maintained for 1 hour. X-ray diffractometric analysis (XRD) of the matrix thus produced showed a small proportion of a microcrystalline structure of an $\alpha$-$Si_3N_4$ phase, while the majority of the matrix was amorphous.

The flexural breaking strength measured on the resulting fiber composite material is again recorded in the table.

EXAMPLE 7

A multifilament of 500 individual fibers was prepared analogously to Example 6A) and then subjected to the three-step sequence (impregnation, rendering non-fusible, heating) according to Example 6B) three times in succession. The result of the flexural breaking strength measurement is shown in the following table.

TABLE

| Example No. | Fiber material | Flexural breaking strength MPa |
| --- | --- | --- |
| 1 | C | 220 |
| 2 | C | 295 |
| 3 | $Al_2O_3$—$SiO_2$ | 254 |
| 4 | SiC | 351 |
| 5 | $Si_3N_4$ | 434 |
| 6 | $Si_3N_4$/SiC | 427 |
| 7 | $Si_3N_4$/SiC | 512 |

We claim:
1. A process for the preparation of a fiber-reinforced composite material, which comprises impregnating fibers that are resistant to pyrolysis temperatures with a molten polysilazane in a first step, converting the polysilazane in the fibers into the non-fusible state by means of NH$_3$, urotropine or an amine in a second step, and heating the impregnated fibers to 800° to 2000° C. in a nitrogen, noble gas or ammonia atmosphere in a third step, the polysilazanes being obtained by reacting oligosilazanes of the formula (I)

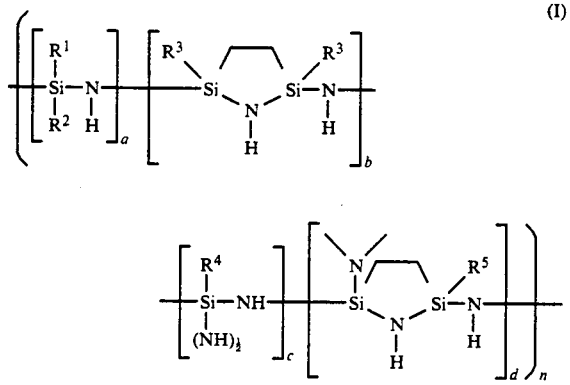

in which $0 \leq a$, $b \leq 1$, $a+b \geq 0.3$, $0 \leq c$, $d < 0.7$ and n is about 2 to about 12, with at least one of the chlorosilanes Cl$_2$R$^6$Si—CH$_2$CH$_2$SiR$^6$Cl$_2$, Cl$_3$Si—CH$_2$CH$_2$—SiR$^8$Cl$_2$, R$^8$ SiCl$_3$ or R$^9$ Cl$_3$ or R$^9$ SiHCl$_2$ in which, independently of one another, R$^1$, R$^2$ and R$^4$ are H, C$_1$-C$_6$-alkyl or C$_2$-C$_6$-alkenyl and R$^3$, R$^5$, R$^6$, R$^7$, R$^8$ and R$^9$ are C$_1$-C$_6$-alkyl or C$_2$-C$_6$-alkenyl, at 30° C. to 300° C. and wherein the reaction of oligosilazanes of the formula (R$^1$SiHNH)$_n$ with R$^9$SiHCl$_2$ is to be excluded.

2. The process as claimed in claim 1, wherein, independently of one another, R$^1$, R$^2$ and R$^4$ are H, C$_1$-C$_3$-alkyl or C$_2$-C$_3$-alkenyl and R$^3$, R$^5$, R$^6$, R$^7$, R$^8$ and R$^9$ are C$_1$-C$_3$-alkyl or C$_2$-C$_3$-alkenyl.

3. The process as claimed in claim 1, wherein R$^1$=H, R$^2$=R$^3$=R$^5$=R$^6$=R$^7$=R$^9$=CH$_3$ and, independently of one another, R$^4$ and R$^8$ are CH$_3$ or vinyl.

4. The process as claimed in claim 1, wherein fibers of C, SiC, Si$_3$N$_4$ or Al$_2$O$_3$ or carbon fiber-reinforced carbon are used.

5. The process as claimed in claim 1, wherein the molten polysilazane is a first spun into fibers, these are converted into a fiber containing silicon nitride by means of heat at 800° to 1600° C., a two- or three-dimensional structure is formed from the fiber, this is then impregnated with the same or another molten polysilazane, the polysilazane is converted into the non-fusible state by means of NH$_3$, urotropine or an amine and the structure is heated to 800° to 2000° C.

6. The process as claimed in claim 1, wherein the sequence of the three process steps is carried out on the same fibers at least twice in succession.

7. The process as claimed in claim 1, wherein compounds of magnesium, aluminum, yttrium or a rare earth metal, individually or as a mixture, are dissolved in the molten polysilazane as a filler for the fibers and the fibers are impregnated with this solution instead of with pure polysilazane.

8. The process as claimed in claim 7, wherein the nitrates, alcoholates, acetates or acetylacetonates of the metals mentioned, individually or as a mixture, are used as the filler.

9. A process for coating a fiber-reinforced composite material, which comprises mechanically working a fiber-reinforced composite material obtained by the process as claimed in claim 1, said mechanically working comprising at least one of cutting, milling, polishing and drilling, and subsequently coating the mechanically worked fiber-reinforced composite material with molten polysilazane in a first step, converting the polysilazane into the non-fusible state by means of NH$_3$, urotropine or an amine in a second step, and heating the coated fiber-reinforced composite material to 800° to 2000° C. in a nitrogen, noble gas or ammonia atmosphere in a third step.

* * * * *

UNITED STATES PATENT AND TRADEMARK OFFICE
CERTIFICATE OF CORRECTION

PATENT NO. : 5,225,243

DATED : July 6, 1993

INVENTOR(S) : Brück et al

It is certified that error appears in the above-identified patent and that said Letters Patent is hereby corrected as shown below:

Title Page under item [56] References Cited:

The "U.S. Patent Documents" subsection of the "References Cited" section of the above-identified patent should read as follows:

U.S. PATENT DOCUMENTS

| | | | |
|---|---|---|---|
| 4,460,638 | 7/1984 | Haluska | 428/224 |
| 5,032,663 | 7/1991 | Vaahs et al. | 525/477 |
| 5,100,975 | 3/1992 | Vaahs et al. | 528/37 |
| 5,114,749 | 5/1992 | Nishio et al. | 427/226 |
| 5,133,993 | 7/1992 | Streckert et al. | 427/226 |
| 5,145,812 | 9/1992 | Arai et al. | 501/97 |
| 5,176,941 | 1/1993 | Peuckert et al. | 427/226 |

The "Foreign Patent Documents" subsection of the "References Cited" section of the above-identified patent should read as follows:

FOREIGN PATENT DOCUMENTS

| | | |
|---|---|---|
| 0125772 | 11/1984 | European Pat. Off. |
| 0331424 | 9/1989 | European Pat. Off. |

Column 11, claim 1, line 31, should be corrected to read
-- $H_2\text{-}SiR^7Cl_2$, $R^8SiCl_3$ or $R^9SiHCl_2$ in which, --.

UNITED STATES PATENT AND TRADEMARK OFFICE
CERTIFICATE OF CORRECTION

PATENT NO. : 5,225,243
DATED : July 6, 1993
INVENTOR(S) : Brück et al

It is certified that error appears in the above-identified patent and that said Letters Patent is hereby corrected as shown below:

Column 12, claim 5, line 8, between "is" and "first", the word "a" should be removed.

Signed and Sealed this

Seventeenth Day of May, 1994

BRUCE LEHMAN

Attest:

Attesting Officer

Commissioner of Patents and Trademarks